United States Patent [19]

van der Lely

[11] 4,042,039
[45] Aug. 16, 1977

[54] ROTARY HARROWS

[76] Inventor: Cornelis van der Lely, 7, Bruschenrain, Zug, Switzerland

[21] Appl. No.: 608,564

[22] Filed: Aug. 28, 1975

[30] Foreign Application Priority Data

Sept. 3, 1974 Netherlands .................... 7411643

[51] Int. Cl.² .................. A01B 33/06; A01B 33/14
[52] U.S. Cl. ............................ 172/59; 172/96; 172/103; 172/117; 172/705; 172/710
[58] Field of Search .............. 172/38, 59, 96, 103, 172/117, 261, 264, 265, 526, 705, 706, 707, 709, 710; 56/6, 7, 10.4, 12.7

[56] References Cited

U.S. PATENT DOCUMENTS

| 1,418,933 | 6/1922 | Kirschke | 172/96 |
| 1,890,537 | 12/1932 | Frank | 172/59 |
| 2,193,157 | 3/1940 | Ayo | 172/117 |
| 2,531,557 | 11/1950 | Dayton | 172/38 |
| 2,560,443 | 7/1951 | Hosford | 172/59 X |
| 3,070,938 | 1/1963 | Winget | 56/6 |
| 3,131,774 | 5/1964 | van der Lely | 172/526 |
| 3,137,350 | 6/1964 | Horr | 172/117 |
| 3,367,425 | 2/1968 | Heeren | 172/59 X |

FOREIGN PATENT DOCUMENTS

| 1,468,829 | 1/1967 | France | 172/117 |
| 7,200,086 | 7/1973 | Netherlands | 172/59 |

Primary Examiner—Richard T. Stouffer
Attorney, Agent, or Firm—Mason, Mason & Albright

[57] ABSTRACT

A cultivator or harrow has an elongated frame and a row of rotatable soil working members pivoted to the frame for independent displacement when an obstacle is contacted. Each soil working member can be tined support having an upwardly extending shaft drivenly connected to a common drive shaft or gear train. Pivotable connections between the frame and the upwardly extending shafts permit deflective movements of each member as a unit with respect to a hollow beam of the frame. The connections can be housings and/or spring biased tie parts with bearings or bracket-support pivot connections or cranks that enable the soil working members to move about at least one axis relative to the frame beam. Also, the upwardly extending shafts can be connected to the driving means by universal joints or resilient couplings. Each soil working member is biased by springs or normally assumes a central equilibrium position. Additional rotary soil working members can be fixed to the frame and positioned between the deflectable members.

67 Claims, 15 Drawing Figures

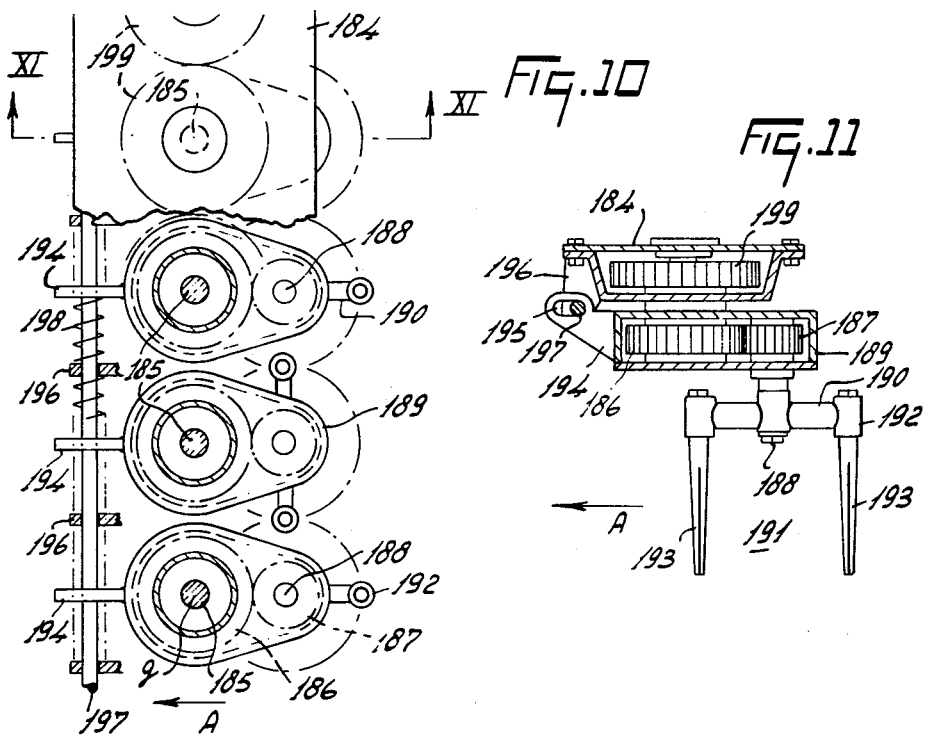

ROTARY HARROWS

Figure 1:
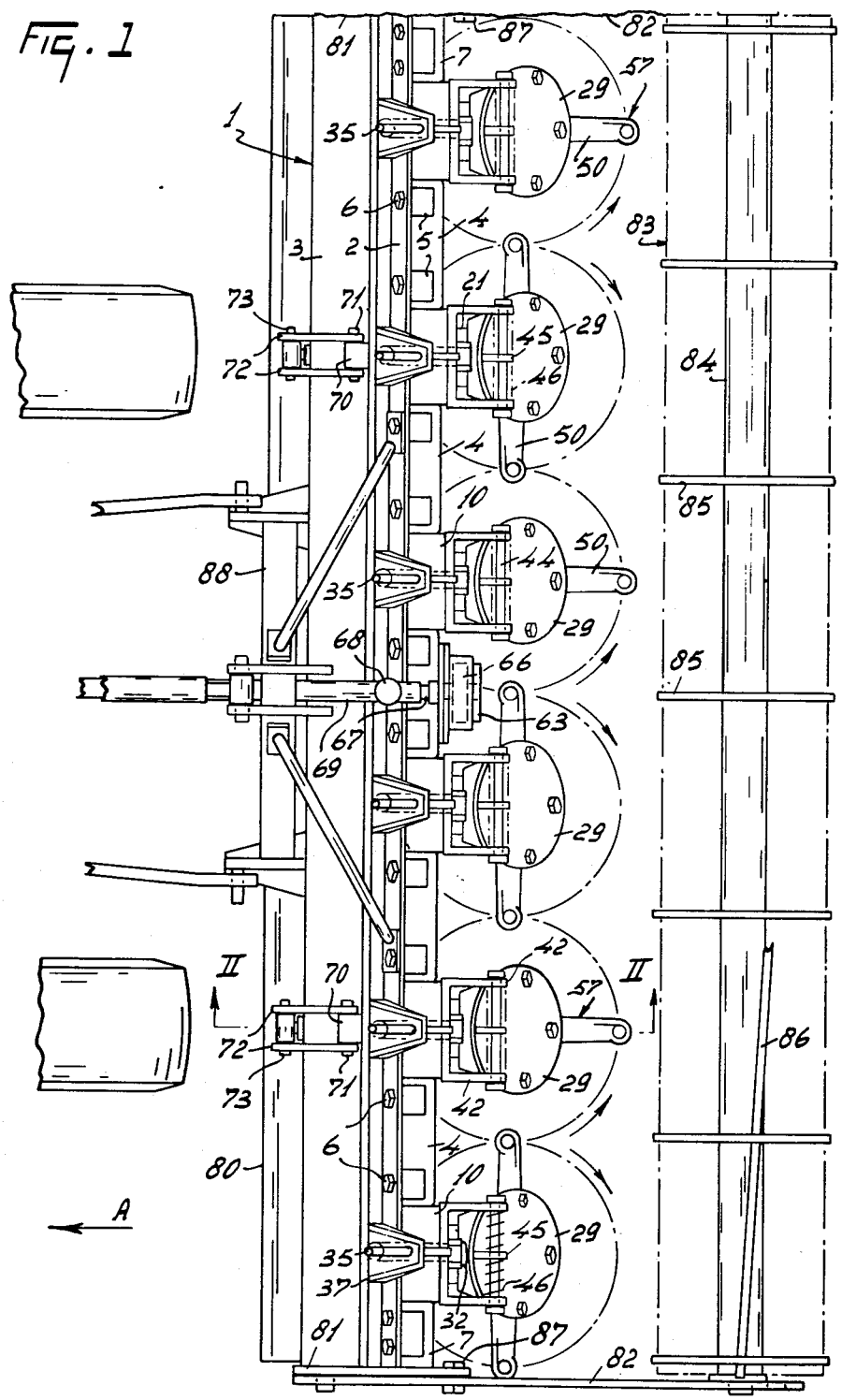
Figure 2:
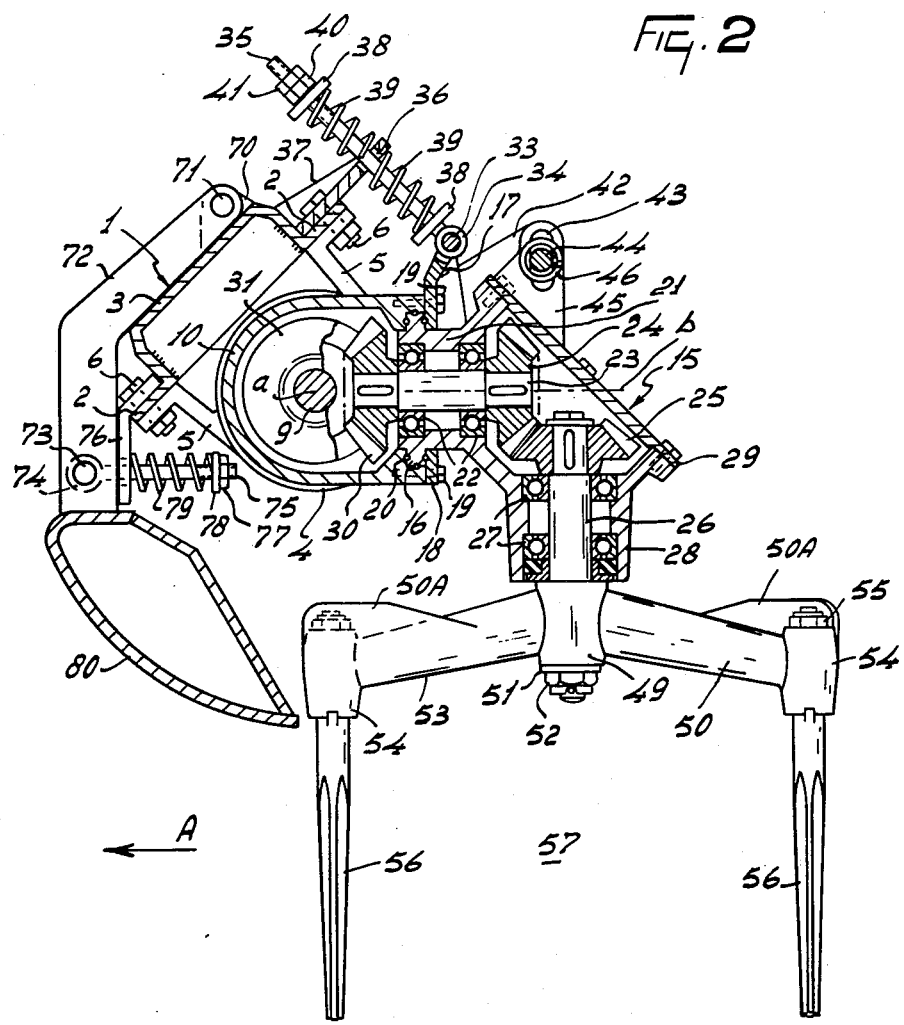
Figure 3:
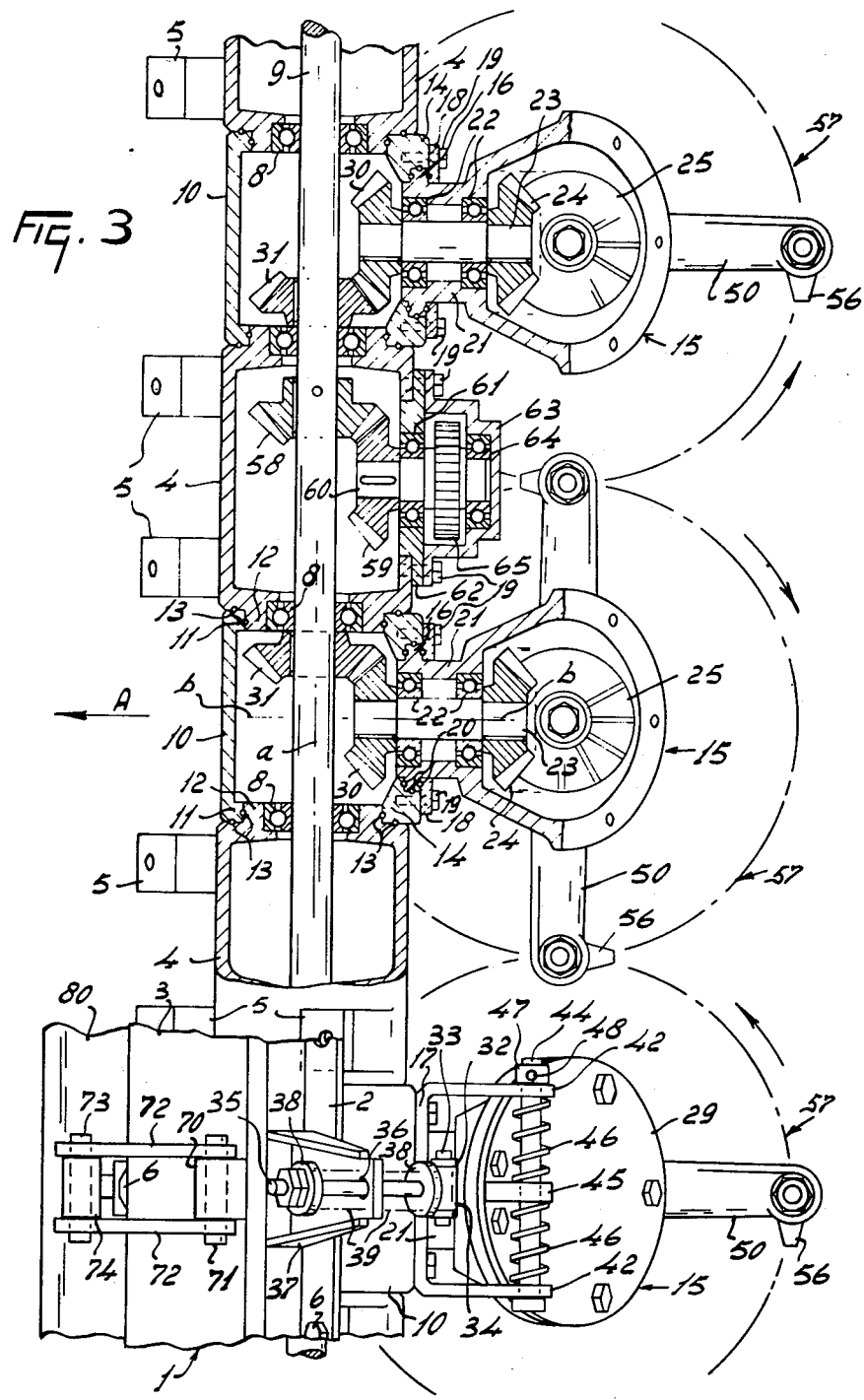
Figure 4:
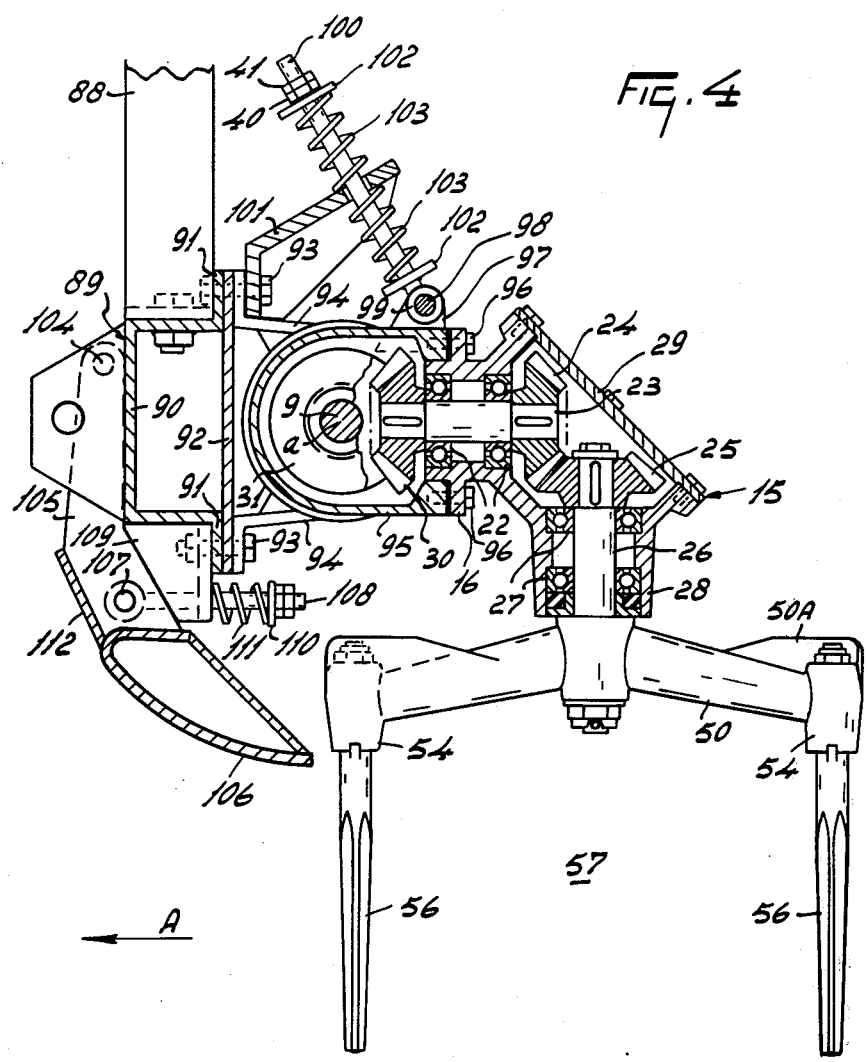
Figure 5:
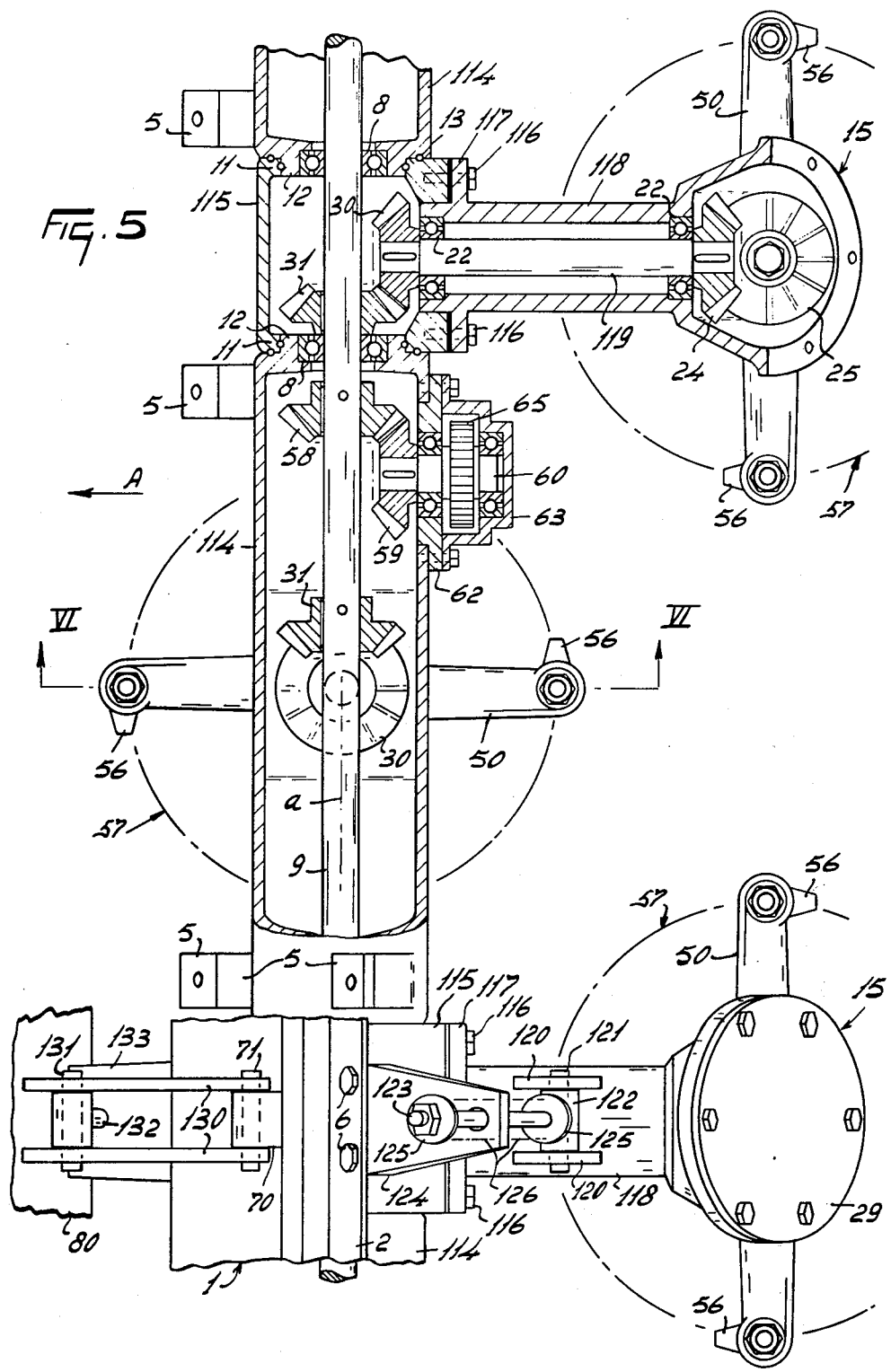
Figure 6:
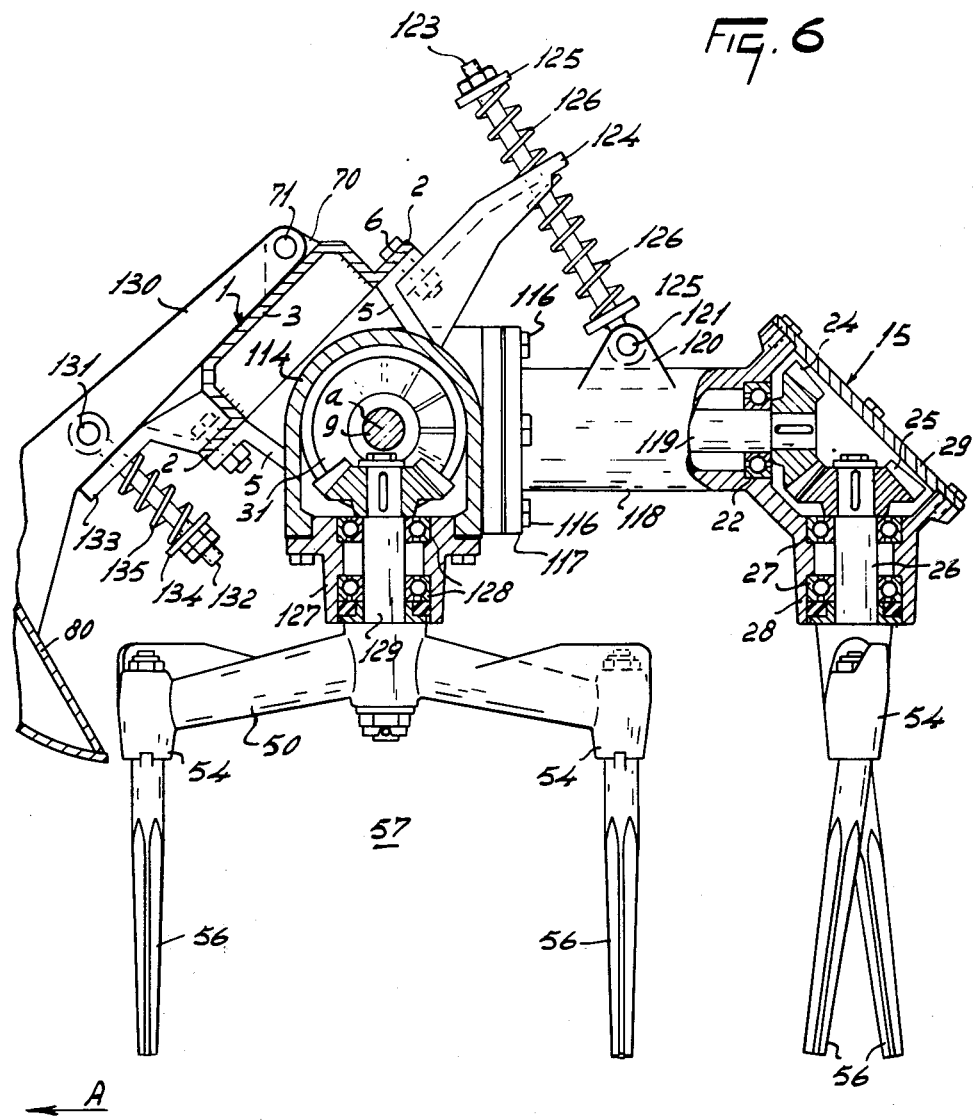
Figure 7:
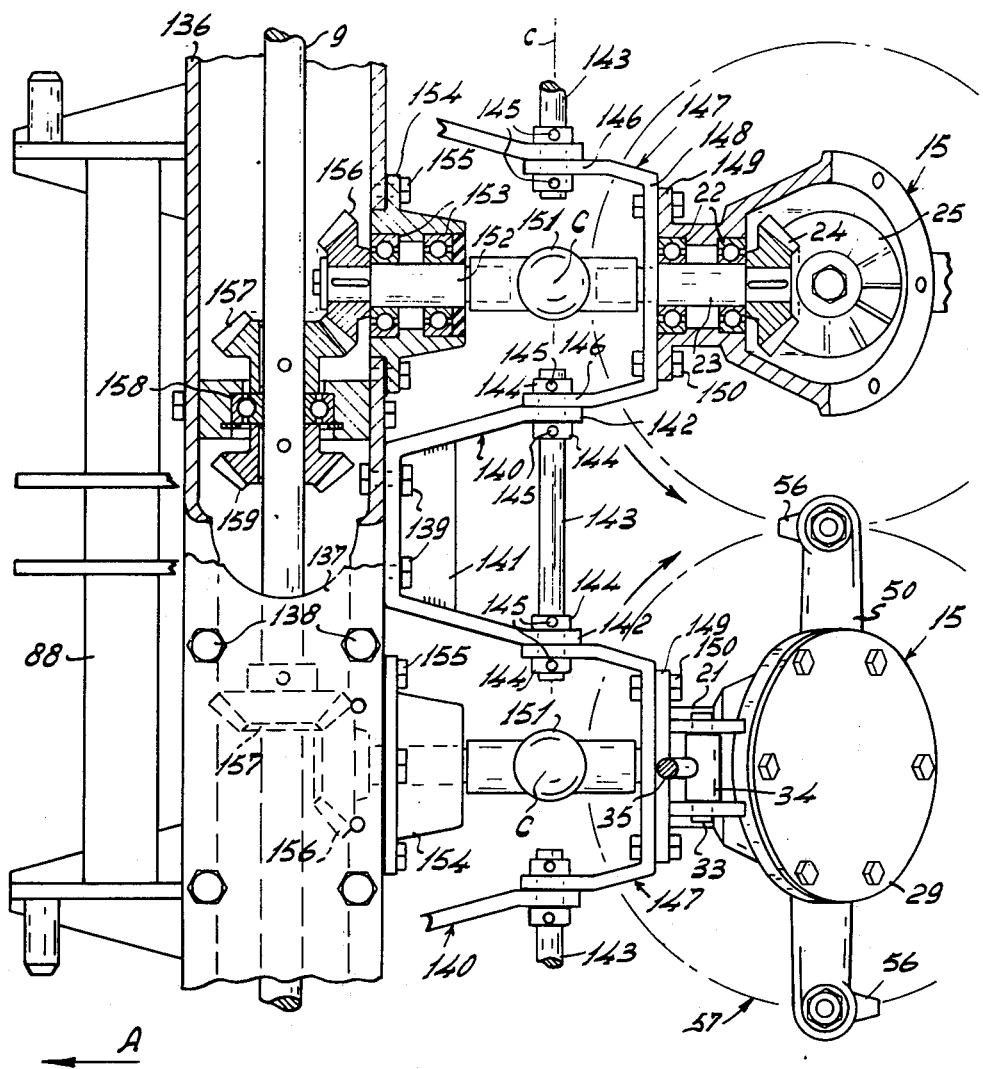
Figure 8:
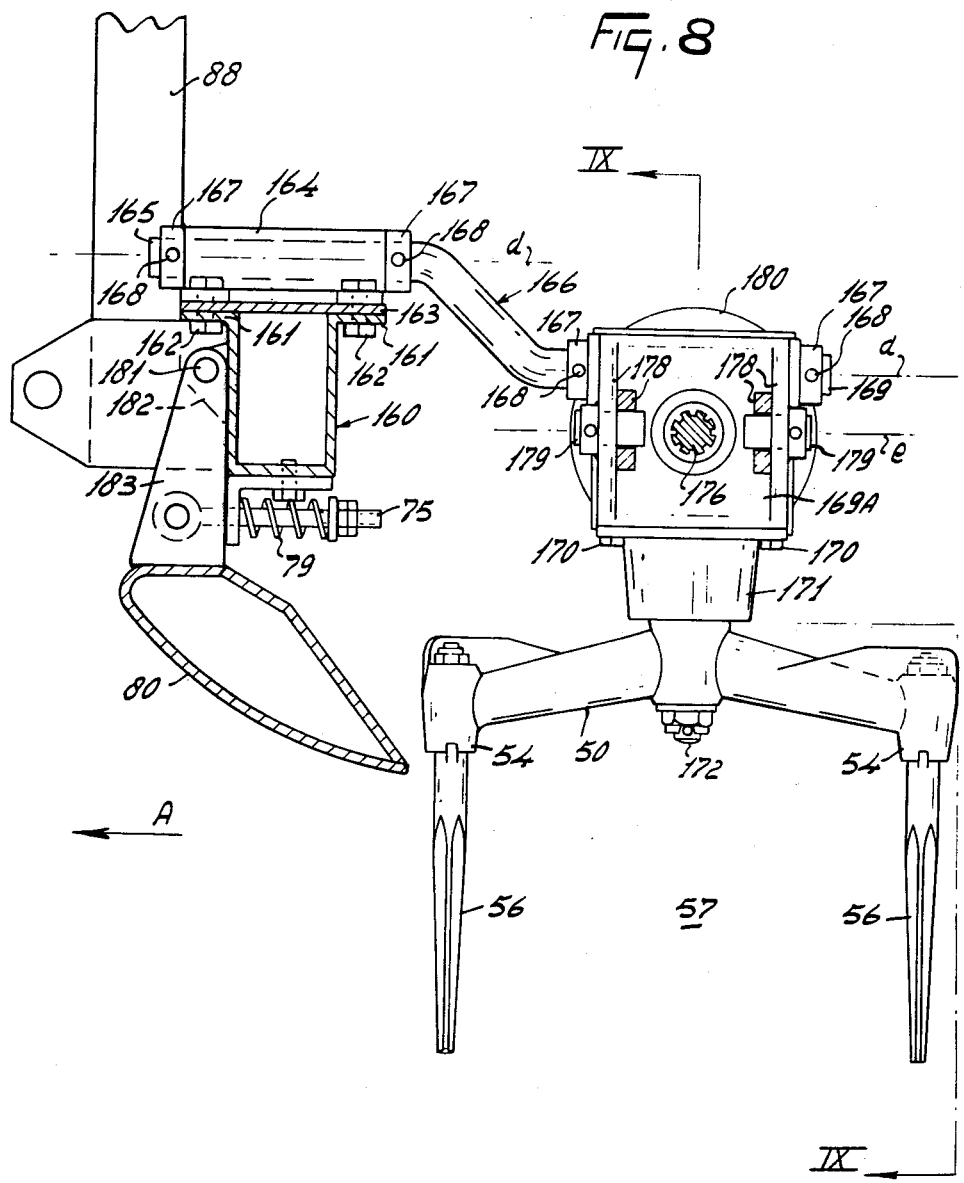
Figure 9:
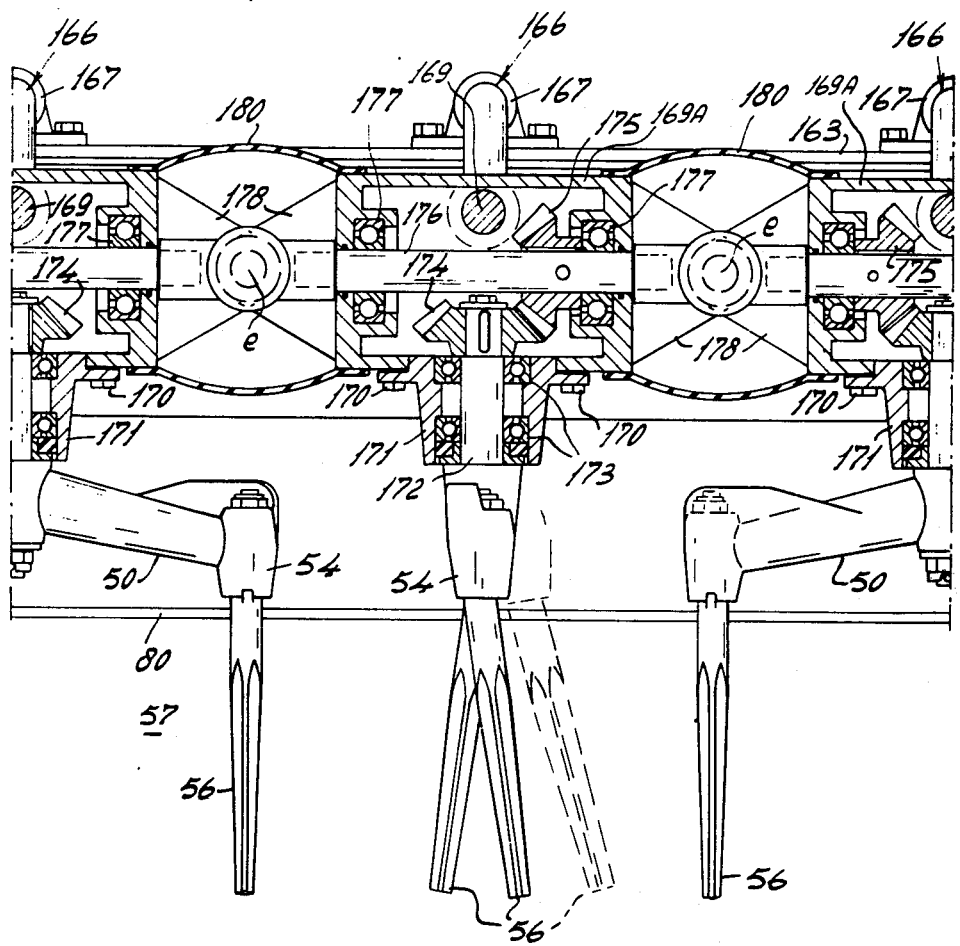
Figure 14:
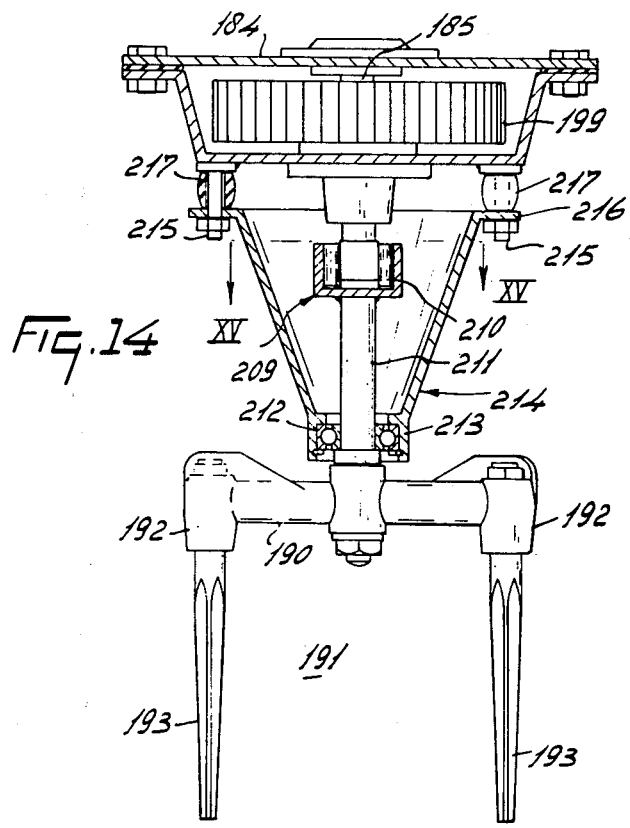
Figure 15:
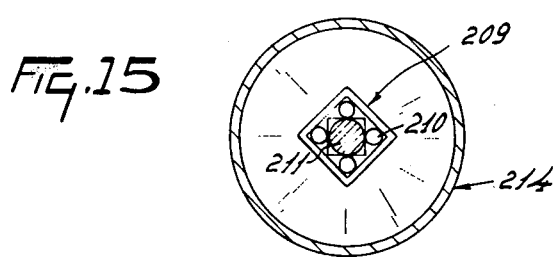

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a part-sectional elevation, to an enlarged scale, the section being taken on the line II—II in FIG. 1, an arm being omitted, FIG. 3 is a part-sectional plan view, to the same scale as FIG. 2, illustrating parts that can be seen in FIG. 1 of the drawings in greater detail, FIG. 4 is a section, to an enlarged scale, taken on the line II—II in FIG. 1 but illustrates an alternative embodiment, FIG. 5 is a part-sectional view to the same scale as FIGS. 2 and 3 but illustrates a further alternative embodiment, FIG. 6 is a part-sectional elevation, the lefthand sectional region of FIG. 6 being taken on the line VI—VI in FIG. 5, FIG. 7 is a part-sectional plan view that is similar to FIGS. 3 and 5 but that illustrates a further alternative construction, FIG. 8 is a section that is silimar to FIG. 2 but illustrates another alternative construction, FIG. 9 is a section taken on the line IX—IX in FIG. 8, FIG. 10 is a part-sectional plan view, to the same scale as FIG. 1, illustrating parts of a further alternative embodiment in accordance with the invention, FIG. 11 is a section taken on the line XI—XI in FIG. 10, FIG. 12 is a similar sectional view to FIG. 11 but illustrates a further alternative construction, FIG. 13 is a rear elevation as seen in the direction indicated by an arrow XIII in FIG. 12, FIG. 14 is a sectional view, similar to FIG. 2 but to a reduced scale, of a still further alternative embodiment in accordance with the invention, and FIG. 15 is a section taken on the line XV—XV in FIG. 14.

The soil cultivating implements or rotary harrows that will be described will hereinafter be referred to, throughout the descriptive portion of this Specification, merely as rotary harrows for the sake of brevity. Referring to FIGS. 1 to 3 of the drawings, the rotary harrow that is illustrated therein has a frame which comprises a main beam 1 that extends substantially horizontally transverse, and normally substantially horizontally perpendicular, to the intended direction of operative travel of the harrow which is indicated in the three Figures by the reference A. The beam 1 is of channel-shaped cross-section and is arranged, as can be seen best in FIG. 2 of the drawings, with its base 3 uppermost and with its limbs projecting downwardly, and rearwardly with respect to the direction A, from said base 3. The free edge of each limb has a corresponding perpendicularly outwardly bent over rim 2, the two rims 2 both being contained in a plane that is substantially parallel to that which contains the base 3. The main frame beam 1 constitutes a support for a plurality of relatively spaced cast iron housings 4, said housings 4 being formed with pairs of lugs 5 that are firmly but releasably fastened to the rims 2 of the beam 1 by bolts 6. In the embodiment which is being described, there are five of the cast iron housings 4, each housing 4 having a substantially oblong cross-section which is, however, rounded off at its end. The five housings 4 are arranged at equal intervals between the opposite ends of the main frame beam 1 and, at those ends, two smaller cast iron housings 7 are arranged, the cross-section of each housing 7 being substantially the same as that of each housing 4 but the length of each housing 7 being approximately half that of each housing 4. A driving shaft 9 is rotatably supported by ball bearings 8 so as to extend right through the housings 4 and 7 in a direction parallel to the transverse length of the frame beam 1 and thus in a substantially horizontal direction that is normally substantially perpendicular to the direction A.

A plurality (of which there are six in the embodiment that is being described) of tie parts 10 that are of partly cylindrical configuration are arranged around the driving shaft 9 between each neighbouring pair of housings 4 or housings 4 and 7. The tie parts 10 have rims 11 that co-operate with seats 12 formed at the ends of the housings 4 and 7 so that the tie parts 10 are capable of turning, relative to the housings 4 and 7, about the longitudinal axis a of the drive shaft 9. When the harrow is in course of assembly, the housings 4 and 7 and the intervening tie parts 10 are slid axially onto the drive shaft 9 in the correct order to form a box-shaped part that is then secured to the frame beam 1 by the lugs 5 and the bolts 6. Fluid seals 13 (FIG. 3) are arranged between the rims 11 and the seats 12 of the relatively angularly displaceable tie parts 10 and housings 4 and 7. The rear of each tie part 10, with respect to the direction A, is provided with a seat 14 to which is turnably connected a flange 16 of a corresponding gear box 15. Each flange 16 is maintained in its appointed position by a corresponding pair of half rings 17 and 18 that are fastened to the top and bottom of the corresponding seat 14 by bolts 19. Fluid seals 20 are arranged between each seat 14 and the corresponding flange 16 and half rings 17 and 18. The flanges 16 are members of forwardly extending, with respect to the direction A, cylindrical parts 21 of the gear boxes 15. Each cylindrical part 21 rotatably supports a corresponding substantially horizontal shaft 23 with the aid of a pair of ball bearings 22, each shaft 23 being substantially parallel to the direction A. Each shaft 23 carries, inside the corresponding gear box 15, a bevel pinion 24 whose teeth are in mesh with those of a further bevel pinion 25 mounted at the upper end of a corresponding upwardly extending and normally vertical or substantially vertical shaft 26 (FIG. 2). Each shaft 26 is rotatably mounted in a downwardly extending cylindrical portion 28 of the corresponding gear box 15 with the aid of upper and lower ball bearings 27. The top of each gear box 15 is closed by a cover plate 29 that is inclined to the horizontal and to the vertical in such a way that its upper edge is further advanced with respect to the direction A than is its lower edge.

The leading end of each shaft 23 with respect to the direction A is located inside the corresponding tie part 10 and there carries a bevel pinion 30 whose teeth are in mesh with those of a bevel pinion 31 that is fastened to the driving shaft 9. The top of each upper half ring 17 is formed with a part (FIG. 2) that is bent over rearwardly with respect to the direction A by a few degrees, said part carrying two upright lugs 32 which receive a corresponding pivot pin 33 that extends substantially horizontally parallel to the driving shaft 9 and to the frame beam 1. Each pivot pin 33 is entered axially through a sleeve 34 which is disposed between the corresponding pair of lugs 32 and that is perpendicularly secured to the lowermost end of a corresponding rod 35. Each rod 35 is inclined upwardly, and forwardly with respect to the direction A, from the corresponding sleeve 34 and is entered through a hole 36 in a supporting bracket 37 that is fastened to the top of the main frame beam 1 by some of the bolts 6. Each supporting bracket 37 is inclined upwardly, and rearwardly with respect to the direction A, from the main frame beam 1. The end of each rod 35 that is remote from the corresponding sleeve 34 is screwthreaded and two stop rings 38 are mounted on the rod, one close to the corresponding sleeve 34 and the other near the end of the rod that is remote from said sleeve. Two helical compression springs 39 that are of equal strengths surround each rod 35 between the stop ring 38 that is close to the corresponding sleeve 34 and the corresponding supporting bracket 37 and between that bracket 37 and the other stop ring 38, respectively. The last-mentioned stop ring 38 abuts against a nut 40 that is adjustably mounted on the screwthreaded end of the rod 35 concerned, a co-operating lock nut 41 being provided so that the degree of initial compression of the two springs 39 can be increased or decreased as may be desired.

Each upper half ring 17 also has a pair of lugs 42 that project rearwardly therefrom with respect to the direction A in parallel relationship. Upper rear regions of the two lugs 42 of each pair are formed with substantially vertically extending slots 43 through which is entered a corresponding headed pin 44. The pin 44 also passes, substantially midway between the lugs 42, through a hole in a bracket 45 mounted on top of the cover plate 29 of the corresponding gear box 15. Each pin 44 is prevented from becoming axially disconnected from the lugs 42 and the bracket 45 by a retaining ring 47 that surrounds the end of it which is remote from its head, a resilient "safety" pin 48 of known construction being entered through holes in the ring 47 and pin 44 to complete the assembly. The helical compression springs 46 surround each pin 44 and bear between the opposite sides of the corresponding bracket 45 and the inner surfaces of the corresponding pair of lugs 42, respectively.

The end of each normally vertical or substantially vertical shaft 26 that projects from beneath the bottom of the corresponding gear box portion 28 is splined and receives a matchingly internally splined hub 49 at the centre of a corresponding tine or other tool support 50. Each shaft 26 is formed, beneath the splined portion thereof, with a short screwthreaded stub shaft and the corresponding hub 49 is maintained in position on said splined portion by a washer 51 and a fastening nut 52 that co-operates with said screwthreaded stub shaft, a split pin or the like preferably being provided, as illustrated in FIG. 2, to prevent the fastening nut 52 from working loose when the rotary harrow is in operation. Each tine or other tool support 50 comprises two arms 53 that are inclined outwardly and downwardly away from the corresponding hub 40 and whose opposite free ends carry corresponding substantially vertically disposed cylindrical tine or other tool holders 54. In the embodiment which is being described, each holder 54 receives an upper fastening portion of a corresponding rigid soil working tine 56, said fastening portion having a screwthreaded part which co-operates, at the upper end of the corresponding holder 54, with a nut 55. The longitudinal axes of the holders 54 extend parallel or substantially parallel to the longitudinal axes of the corresponding shafts 26 and, at the tops of said holders 54 and of the arms 53, at the fronts thereof with respect to the intended directions of rotation of the corresponding shafts 26, rigid screens 50A are provided to protect the nuts 55 and screwthreaded parts of the tines 56 from damage by sharp stones and other potentially injurious objects that may be met with by the harrow during its operation. Each tine or other tool support 50 and it tines 56 or other tools constitutes a rotary soil working member that is generally indicated by the reference 57. In the embodiment that is being described, each tine 56 has a lower soil working portion that tapers downwardly and that is inclined rearwardly by a few degrees with respect to the corresponding intended direction of operative rotation (see the arrows in FIGS. 1 and 3 of the drawings) from the overlying tine fastening portion. The tines 56 may thus be said to "trail" to some extent with respect to said directions of rotation. It will be seen from the drawings that the intended directions of operative rotation are such that, during operation, each soil working member 57 will revolve in the opposite direction to it neighbour or to both of its neighbours in the single row thereof. This arrangement is achieved by appropriate dispositions of the corresponding pinions 31 on the driving shaft 9.

The central housing 4 of the row of five thereof contains a bevel pinion 58 that is fastened to the driving shaft 9. The teeth of the bevel pinion 58 are in driven mesh with those of a further bevel pinion 59 carried by a stub shaft 60 that extends substantially horizontally parallel to the direction A to the rear of the driving shaft 9. Some of the bolts 19 are used to mount a support 62 for a ball bearing 61 in an opening in the rear of the housing 4 concerned and said stub shaft 60 is rotatably journalled in that ball bearing 61. The same bolts 19 secure the rim of a cover 63 to the support 62 and to the housing 4 and the rear of said cover 63 supports a second ball bearing 64 in which the stub shaft 60 is also rotatably journalled. The stub shaft 60 carries, between the ball bearings 61 and 64, a straight-toothed or spur-toothed pinion 65 whose teeth are in mesh with those of an overlying and similarly toothed pinion 66 (FIG. 1) which is secured to a shaft 67 that is also rotatably mounted in the cover 63 so as to extend parallel to the stub shaft 60. The shaft 67 projects forwardly from the front of the cover 63 and is there splined or otherwise keyed to enable it to be placed in driven connection with the power take-off shaft of an operating agricultural tractor or other vehicle (FIG. 1) through the intermediary of a telescopic transmission shaft 69, that is of a construction which is known per se, having universal joints 68 at its opposite ends.

Lugs 70 are rigidly mounted on top of the base 3 of the main frame beam 1 at equal distances on opposite sides of the midpoint of that beam 1 and each lug 70 receives a corresponding pivot pin 71 that is substantially horizontally parallel to the beam 1 and thus normally substantially perpendicular to the direction A. Each pin 71 also passes through holes in the ends of two arms 72 that are located at opposite sides of the lug 70 concerned. Each arm 72 (FIG. 2) has a portion that extends forwardly and downwardly across the upper surface of the base 3 of the beam 1 and a further portion which is integrally connected to the leading end thereof by an angular bend so as to extend substantially vertically downwards from that bend. A stub shaft 73 connects the two arms 72 of each pair near the lower ends of the downwardly directed substantially vertical portion thereof. Each stub shaft 73 is surrounded by a corresponding sleeve 74 between the pair of arms 72 concerned and one end of a rod 75 is perpendicularly secured to each sleeve 74 midway along the length of the latter. The rods 75 extend rearwardly with respect to the direction A from the sleeves 74 and are entered through holes in corresponding stop lugs 76 which are fastened to the leading rim 2 of the frame beam 1 by some of the bolts 6 so as to depend downwardly from that rim 2. The rearmost ends of the rods 75 are screwthreaded and carry axially adjustable nuts 77 and adjoining washers 78. A helical compression spring 79 surrounds each rod 75 between the corresponding lug 76 and washer 78 and its degree of initial compression can, of course, be increased or decreased by an appropriate adjustment of the corresponding nut 77. Co-operating lock nuts that are not shown in the drawings are preferably provided for use with the nuts 77. The lowermost end of all four of the arms 72 are secured to the top of a hollow beam 80 that extends substantially parallel to the main frame beam 1 and whose top surface is contained in a substantially horizontal plane. The front, with respect to the direction A, of the top surface of the beam 80 is bent over downwardly to merge integrally into the upper edge of a cylindrically curved portion that extends downwardly and rearwardly with respect to the direction A, the lower edge of said portion being nearly horizontally disposed and being substantially vertically in register with the overlying driving shaft 9. The rear edge of the top surface of the beam 80 is connected to the rear edge of the cylindrically curved portion thereof by upper and lower flat portions that are integrally interconnected by an angular bend, the upper flat portion being less steeply inclined to the horizontal than is the lower flat portion. The lowermost and rearmost edge of the beam 80 that coincides with the junction between the cylindrically curved portion and the lower flat portion thereof is located just in front, with respect to the direction A, of the circular paths that are traced by the tines 56 of the soil working members 57 during the rotation of the latter. During the operation of the rotary harrow, the beam 80 affords a very considerable degree of protection to the soil working members 57 that immediately follow it in the direction A because said beam 80 tends to displace downwardly any stones or the like which it may meet. If a stone or other obstacle should become momentarily jammed between the beam 80 and at least one of the soil working member 57, the beam 80 can deflect forwardly about the axis defined by the pivot pins 71, against the action of the compression springs 79, to allow the stone or other obstacle to be released. The springs 70 then immediately restore the beam 80 to its undeflected position as shown in FIG. 2 of the drawings. In addition to the functions which have just been mentioned, the beam 80 has a levelling effect upon the surface of the soil and can, under some conditions, partially support the harrow from the ground surface.

The opposite ends of the main frame beam 1 are closed by substantially vertically disposed sector plates 81 that extend substantially parallel to the direction A. Arms 82 (not shown in FIG. 2 of the drawings) are turnable upwardly and downwardly alongside the sector plates 81 about a substantially horizontal axis that is defined by strong pivots fastened to said sector plates. The arms 82 extend rearwardly beyond the sector plates 81 with respect to the direction A and rear end regions thereof are provided with substantially horizontal bearings in which a supporting member, in the form of an open ground roller 83, is rotatably mounted. The rotatable supporting member that is afforded by the roller 83 has a central tubular support 84 to which are secured, at regular intervals along its length, a plurality, such as seven, of substantially vertical support plates 85 whose peripheries are interconnected by a plurality of regularly spaced apart elongated elements 86 that are entered through holes formed in said support plates 85 so as to extend generally parallel to the support 84 while being helically wound around the support 84 to some extent. The elongated elements 86 are preferably rods of circular cross-section and are entered through the holes in the peripheries of the support plates 85 with sufficient clearance to enable said elements 86 to move relative to those plates. The rear edge of each sector plate 81 with respect to the direction A is curved and a row of holes is formed close to that edge with each hole spaced from the pivotal connection of the arms 82 to the plates 81 by the same distance. The arms 82 are formed with single holes that can be brought into register with any chosen ones of the rows of holes in the sector plates 81 and horizontal bolts 87 are provided for entry through said single holes and the chosen holes in the sector plates 81 to retain the arms 82 in corresponding angular settings about their pivotal connections to the sector plates 81. It will be realised that the angular settings that are chosen determine the level of the axis of rotation of the ground roller 83 relative to the level of the remainder of the rotary harrow and that this is a principal factor in determining the depth of penetration of the tines 56 of the soil working members 57 into the ground which takes place during the operation of the harrow. The front of the main frame beam 1 with respect to the direction A is provided with a coupling member or trestle 88 of generally triangular configuration, said coupling member or trestle 88 being constructed and arranged for connection to the three-point lifting device or hitch at the rear of an agricultural tractor or other operating vehicle in a manner that is generally known per se and that can be seen in outline in FIG. 1 of the drawings.

In the use of the rotary harrow that has been described with reference to FIGS. 1 to 3 of the drawings, its coupling member or trestle 88 is connected to the three-point lifting device or hitch at the rear of an agricultural tractor or other operating vehicle and the rotary input shaft 67 is placed in driven connection with the power take-off shaft of the same tractor or other vehicle by way of the intermediate telescopic tramsmission shaft 69 and the universal joints 68. The level of the axis of rotation of the roller 83 relative to that of the remainder of the harrow will previously have been set, as desired, with the aid of the bolts 87 having regard to the nature and condition of the soil that is to be worked. As the harrow passes over soil that is to be cultivated, its soil working members 57 will be rotated by the drive transmission that has been described, each member 57 working an individual strip of land but the dimensions being such that said individual strips just overlap one another to produce, in effect, a single broad strip of worked soil. The dimensions of the soil working members 57 are such that each individual strip of soil that is worked by one of them has a width of between substantially 30 and substantially 40 centimeters. In addition to controlling the depth of penetration of the tines 56 into the soil, the roller 83 gently consolidates the soil broken up by the immediately foregoing members 57 and will crush any lumps of soil that may have been thrown up onto the surface thereof without having been fully broken up by the tines 56. Any obstacle, such as a stone or the like that may be met with during operative progress in the direction A tends to be pushed downwardly into the soil by the beam 80 and the likelihood of damage to the drive transmission to the soil working members 57 and to the fastening portions of the tines 56 is reduced to a minimum. If any downwardly displaced stones or the like should still be contacted by the tines 56, the or each soil working member 57 concerned can deflect about one or both of two mutually perpendicular axes to avoid damage and to ensure that the obstacle is rapidly avoided or released. The axes concerned are the axis $a$ of the drive shaft 9 and the intersecting and relatively perpendicular axis $b$ of the shaft 23 that corresponds to each soil working member 57. Deflection of the whole of each tie part 10, together with the corresponding gear box 15 and soil working member 57, can take place about the axis $a$ of the driving shaft 9 against the action of one, or the other, of the corresponding pair of springs 39 which springs 39 tend to retain each such assembly in a central equilibrium position as illustrated in FIG. 2. Angular displacement of each gear box 15 and the corresponding soil working member 57 can take place, relative to the corresponding tie part 10, about the axis $b$ of the corresponding shaft 23 against the action of one, or the other, of the corresponding pair of springs 46. Once again, the two springs 46 of each pair tend to maintain the corresponding assembly 15/57 in a central equilibrium position about the corresponding axis $b$ as illustrated, in particular, at the foot of FIG. 3 of the drawings. The springs 39 and/or 46 tend to restore each soil working member 57 substantially immediately to its undeflected position relative to the main frame beam 1 once a stone or other obstacle has been avoided or displaced. Effective operation of the harrow is thus partially interrupted for only a very short period of time.

FIGS. 4 to 15 of the drawings illustrate only parts of rotary harrows and it is to be understood that any parts which are not illustrated or described are similar or identical to corresponding parts of the harrow of FIGS. 1 to 3, some such similar or identical parts being indicated in FIGS. 4 to 15 of the drawings by the same references as have been employed in FIGS. 1 to 3 of the drawings. This applies particularly to the rotatable supporting member that is afforded by the open ground roller 83. Each of the rotary harrows of FIGS. 4 to 15 of the drawings incorporates a rotatable supporting member and that rotatable supporting member is similar or identical to the roller 83 that has been described and that is illustrated in FIG. 1.

FIG. 4 of the drawings illustrates a construction in which a main frame beam 89 of channel-shaped cross-section extends substantially horizontally transverse, and normally substantially horizontally perpendicular, to the intended direction of operative travel A. However, in this case, the beam 89 has a base 90 which is substantially vertically disposed and substantially horizontal limbs which project rearwardly from the upper and lower edges of the base 90. The free edges of said limbs are bent over upwardly and downwardly to form rims 91 that are contained in a substantially vertical plane which is spaced rearwardly from, but that is parallel to, the general plane of the base 90. The upper and lower rims 91 are secured by bolts 93 to a substantially vertical plate 92 that is also parallel to the base 90 of the beam 89. The bolts 93 secure the previously described housings 4 and 7 to the plate 92 and beam 89 with the aid of pairs of lugs 94. Tie parts 95 that are equivalent to the previously described tie parts 10 are arranged between the housings 4 and between the housings 4 and 7 and carry the previously described gear boxes 15 and soil working members 57. However, in this embodiment, the flanges 16 of the cylindrical parts 21 of the gear boxes 15 are rigidly, but releasably, secured to the tie parts 95 by bolts 96. The top of each tie part 95 carries a pair of upright lugs 97 to which the opposite ends of a corresponding pivot pin 98 are connected, said pivot pin 98 defining an axis that is substantially parallel to the transverse length of the main frame beam 89. Each pivot pin 98 is surrounded by a corresponding sleeve 99, between the two lugs 97, and one end of a rod 100 is perpendicularly secured to that sleeve 99 substantially midway along the length of the latter. Each rod 100 is entered through a hole in a supporting bracket 101 that projects upwardly, and rearwardly with respect to the diretion A, from the main frame beam 89, to which it is secured by some of the bolts 93. Stop rings 102 surround each rod 100 near its opposite ends and helical compression springs 103, that are of the same strength, surround each rod 100 between the opposite sides of the corresponding bracket 101 and the facing surfaces of the two stop rings 102, respectively. The stop ring 102 that is furthest from each sleeve 99 abuts against the previously described nut 40 which is mounted, with its lock nut 41, on a screwthreaded free end portion of each rod 100. The initial degree of compression of the two springs 103 can, of course, be increased or decreased, as may be desired, by adjusting the nut 40 axially along the screwthreaded portion of the corresponding rod 100.

Horizontal pivot pins 104 that define an axis which is parallel to the transverse length of the main frame beam 89 are connected to lugs which project forwardly from the front of the base 90 of that beam 89 and arms 105 that extend downwardly from said pins 104 are turnably mounted on those pins. The lowermost ends of the arms 105 are rigidly interconnected by a hollow beam 106 that extends substantially parallel to the main frame beam 89, said beam 86 being basically similar in shape and function to the previously described hollow beam 80 except that its rear with respect to the direction A is afforded by a single obliquely disposed flat portion rather than by two flat portions which are integrally interconnected by an angular bend. Pivot pins 107 connect the arms 105 to rods 108 by way of sleeves which surround said pins, the rods 108 being entered through holes in brackets 109 that are fastened to the lower rim 91 of the main frame beam 89 by some of the lower bolts 93. Helical compression springs 111 surround the rods 108 and bear between the rear surfaces of the brackets 109 and the forwardly directed surfaces of washers 110 that also surround said rods 108. The washers 110 abut against nuts that are axially adjustable alonag screwthreaded rear end portions of the rods 108, said nuts preferably, as illustrated in FIG. 4, being accompanied by co-operating lock nuts. In this embodiment, a strip 112 is secured to the leading edges of the arms 105, immediately above the hollow beam 106, said strip 112 occupying an inclined position with respect to both the horizontal and the vertical which is such that its upper edge is further advanced relative to the direction A than is its lower edge, that lower edge being in contact with the beam 106.

The operation of the rotary harrow of FIG. 4 of the drawings is similar to that of the harrow which has already been described with reference to FIGS. 1 to 3 thereof except that, in the embodiment of FIG. 4, the individual soil working members 57 are only deflectable upwardly and downwardly about the single axis $a$ of the driving shaft 9 against the opposition of one or other of the springs 103 and are not also deflectable about corresponding axes that extend substantially parallel to the direction A.

FIGS. 5 and 6 of the drawings illustrate a rotary harrow construction in which housings 114 are provided that are of greater axial length (in a direction parallel to the axis $a$) than are the previously described housings 4. The housings 114 are connected to the main frame beam 1 of the harrow by corresponding pairs of the lugs 5 and tie parts 115 are arranged alternately between them in the same manner as are the previously described tie parts 10. The rear of each tie part 115 with respect to the direction A has the leading end of a cylindrical part 118 of the corresponding gear box 15 turnably connected to it with the aid of bolts 116 and a flange 117. As will be evident from FIGS. 5 and 6 of the drawings, the cylindrical parts 118 of the gear boxes 15 are of considerably greater axial length than are the previously described cylindrical parts 21, the gear boxes 15 and the soil working members 57 being, however, otherwise of substantially identical construction to that described above. Each soil working member 57 is driven from a corresponding shaft 119 that extends substantially horizontally parallel to the direction A, each shaft 119 being entered axially through the corresponding cylindrical part 118 and being substantially identical to one of the previously described shafts 23 except as regards its greater length. The top of each cylindrical part 118 carries a parallel pair of upright lugs 120 in which a horizontal pivot pin 121 that is parallel to the main frame beam 1 is mounted. A sleeve 122 surrounds each pivot pin 121, between the lugs 120, and has one end of a corresponding rod 123 perpendicularly secured to it substantially midway along its length. Each rod 123 is entered through a hole in a corresponding supporting bracket 124 that is fastened to the upper rim 2 of the main frame beam 1 by a pair of the bolts 6 and helical compression springs 126 surround each rod 123 so as to bear between the bracket 124 and stop washers or rings 125 that are located near the opposite ends of the rod 123, respectively. The washer or ring 125 that is located furthest from the corresponding pivot pin 121 abuts against an adjusting nut which can be moved axially along a screwthreaded free end portion of each rod 123 to increase or decrease the degree of initial compression of the two springs 126 as may be required. Lock nuts (not shown) are preferably provided for co-operation with the adjusting nuts. The bottom of each housing 114 is provided, substantially midway along the length of that housing, with a downwardly directed cylindarical bearing housing 127 in which upper and lower ball bearings 128 rotatably support a corresponding upwardly extending and normally vertical or substantially vertical shaft 129. The lowermot end of each shaft 129 carries a corresponding one of the soil working members 57 and its uppermost end is driven from the shaft 9 by way of the co-operating pinions 30 and 31 in the manner that has previously been described. The central housing 114 of the row thereof also supports, at its rear, the previously described assembly of parts 59 to 67 inclusive by which drive is transmitted, during the use of the rotary harrow, from the rotary input shaft 67 thereof to the bevel pinion 58 that is carried by the driving shaft 9 inside the housing 114 concerned. In this embodiment, the pivot pins 71 connect downwardly and forwardly, with respect to the direction A, arms 130 to the lugs 70 that are carried by the main frame beam 1. The lower leading ends of the arms 130 are interconnected by the previously described hollow beam 80 which serves the same functions as previously described but which, in this embodiment, does not have its lower rear edge in substantially vertical register with the driving shaft 9. The arms 130 are provided in pairs, like the arms 72, and each pair thereof is interconnected, substantially midway along the lengths of the arms 130, by a corresponding pivot pin 131, the lower edges of said arms normally contacting stop brackets 133 that are fastened to the lower rim 2 of the main frame beam 1 by appropriate lower bolts 6. A sleeve surrounds each pivot pin 131, between the corresponding arms 130, and a rod 132 projects perpendicularly therefrom in a downward and rearward direction relative to the direction A. A helical compression spring 135 surrounds each rod 132 and bears between the corresponding bracket 133 and a stop ring or washer 134 that is disposed towards the free end of the rod 132 concerned. As in the case of previously described similar assemblies, the stop ring or washer 134 abuts against a nut which is axially displaceable along a screwthreaded end portion of the rod 132 concerned to increase or decrease the initial degree of compression of the spring 135. A lock nut is preferably provided, as illustrated, for use with each adjusting nut. The beam 80 can thus deflect forwardly about the axis defined by the pivot pins 71 against the action of the compression springs 135 to free any momentarily trapped stones or the like as described above.

In the use of the rotary harrow that has been described with reference to the embodiment illustrated in FIGS. 5 and 6 of the drawings, the soil working members 57 are arranged in a staggered or zig-zag row that is normally substantially perpendicular to the direction A and each member 57 rotates in the opposite direction to its neighbour, or to both of its neighbours, in that row. Alternatively, the members 57 could be considered as being located in two straight and parallel rows, the members in one of those rows all rotating in one direction, and the members in the other row all rotating in the opposite direction. The members 57 that are towards the rear of the harrow with respect to the direction A can all deflect upwardly and downwardly about the axis $a$ of the driving shaft 9 independently of each other but the leading members 57 with respect to the direction A that are disposed immediately beneath the shaft 9 are rotatably mounted in a non-defectably manner. It will be noted that the axis $a$ about which the rearwardly disposed soil working members 57 are deflectable is spaced forwardly by a significant distance, in the direction A, from the deflectable members 57 themselves.

FIG. 7 of the drawings illustrates an embodiment in which a hollow main frame beam 136 is provided that is of generally channel-shaped cross-section, the top of said beam 136 being closed by a cover plate 137 that is secured to inwardly directed rims of the underlying beam 136 by bolts 138. The beam 136 extends substantially horizontally transverse, and normally substantially horizontally perpendicular, to the intended direction of travel A of the rotary harrow. The rear of the main beam 136 with respect to the direction A has a plurality of brackets 140 secured to it by bolts 139 at regularly spaced apart intervals, said brackets 140 having limbs which diverge rearwardly from the main frame beam. The rear ends of the limbs of the brackets 140 are bent over inwardly to form parallel portions 142 and the rigidity of each bracket 140 is increased by the provision of a lower strengthening plate 141 that rigidly interconnects the base of the bracket and the root ends of its limbs. The parallel portions 142 of the bracket limbs support pivotal shafts 143 that extend parallel to the transverse length of the main frame beam 136, said shafts 143 being retained against significant axial displacement relative to the brackets 140 by rings 144 that co-operate with resilient safety pins 145 of a construction that is known per se which pins 145 have limbs entered through the rings 144 and through transverse bores in the shafts 143. Each shaft 143 projects by a significant distance beyond the relatively remote surfaces of the two bracket portions 142 through which it is entered and the projecting ends afford stub shafts about which further brackets 147 are turnable relative to the brackets 140 that are fixed to the main frame beam 136. The further brackets 147 comprise tie parts 148 that are the bases of said brackets and forwardly divergent limbs whose free ends are bent over inwardly to form parallel portions 146 through which the shafts 143 are entered and that lie alongside the parallel portions 142 of the brackets 140. The tie parts 148 of the further brackets 147 are located to the rear of the limbs of those brackets with respect to the direction A and are secured by bolts 150 to flanges 149 of the short cylindrical parts 21 of the gear boxes 15, those gear boxes 15 and the soil working members 57 that are connected to them being substantially identical in construction to the previously described parts that are denoted by the same reference. The shaft 23 that transmits drive into each gear box 15 projects through a hole in the tie part or base 148 of the corresponding further bracket 147 and has its leading end with respect to the direction A connected by a universal joint 151 to the rear end of a substantially horizontal shaft 152 that is rotatably supported by two ball bearings 153 in a bearing housing 154 fastened in a hole in the back of the main frame beam 136 by bolts 155. It will be noted from FIG. 7 of the drawings that the shafts 143 are in axial alignment and define an axis c that is also coincident with one of the rocking axes of each universal joint 151 when that universal joint is appropriately disposed as regards its rotation. Each shaft 152 extends forwardly in substantially the direction A into the interior of the main frame beam 136 and is there provided with a bevel pinion 156 whose teeth are in driven mesh with those of a co-operating bevel pinion 157 that is fastened to the driving shaft 9 at an appropriate point axially therealong, said driving shaft 9 extending axially and substantially centrally through the main frame beam 136. Ball bearings 158 rotatably mount the shaft 9 in the interior of the hollow main frame beam 136, said ball bearings 158 being carried by bearing supports that are bolted in position in the beam 136.

A central region of the driving shaft 9 that is close to one of the ball bearings 158 is provided with a bevel pinion 159 that is connected by a further bevel pinion that is not visible in FIG. 7 to a rotary input shaft that extends substantially horizontally parallel to the direction A, that input shaft also not being shown in FIG. 7. The leading splined or otherwise keyed end of the rotary input shaft is arranged to be placed in driven connection with the power take-off shaft of an agricultural tractor operating vehicle by way of an intermediate telescopic transmission shaft, of a construction which is know per se, having universal joints at its opposite ends (see the previously described parts 68 and 69). The coupling member or trestle 88 enables the rotary harrow to be conected to the three-point lifting device or hitch of an agricultural tractor or other operating vehicle in a manner which is generally known per se and it noted that the embodiment of FIG. 7 comprises a hollow beam that is similar in construction and function to one of the previously described hollow beams 80 or 106. In this embodiment, each soil working member 57 is independently upwardly and downwardly displaceable relative to its neighbours and relative to the main frame beam 136 about the axis c. A spring mechanism that comprises the parts 33 to 41 inclusive that have already been described with reference to FIGS. 1 to 3 of the drawings is provided to tend to maintain each soil working member 57 in a central undeflected equilibrium position and the sleeve 34 and rod 35 of one such assembly can be seen towards the bottom right-hand corner of FIG. 7 of the drawings. The actual operation of the rotary harrow of FIG. 7 is similar to that of the embodiment of FIGS. 1 to 3 of the drawings except that each soil working member 57 can deflect only about the axis c which is generally sufficient to avoid damage as the result of stones or other obstacles contacting the tines 56. Deflections of the soil working members 57 do not interrupt the drive to them because of the provision of the universal joints 151 which are all intersected by the axis c.

FIGS. 8 and 9 of the drawings illustrate an embodiment in which a main frame beam 160 of upright channel-shaped cross-section is provided, the upper free ends of the limbs of the channel being bent over outwardly to form substantially horizontal rims 161 that are contained in a substantially horizontal plane which is parallel to, but above, the general plane of the base of the beam 160. The beam 160 extends substantially horizontally transverse, and normaly substantially horizontally perpendicular, to the intended direction of operative travel A and the two rims 161 have a substantially horizontal cover plate 163 fastened to them by substantially vertical bolts 162. Substantially horizontal sleeve bearings 164 are mounted immediately above the cover plate 163 by appropriate bolts 162 at regularly spaced apart intervals which it is preferred should have magnitudes of not less than substantially 30 centimeters and not more than substantially 40 centimeters. The longitudinal axes of the sleeve bearings 164 extend substantially parallel to the direction A and each sleeve bearing 164 turnably holds a corresponding shaft 165 which forms part of a crank 166 that also has a further parallel shaft 169 at its opposite end. The shaft 169 of the cranks 166 are journalled in upper central regions of corresponding housings 169A and both each shaft 165 and each shaft 169 are retained against significant axial displacement relative to the sleeve bearings 164 and housings 169A by surrounding rings 167 provided with transverse safety pins 168 having limbs which pass through holes in the rings and shafts concerned and that are of a construction which is known per se.

Each housing 169A extends substantially longitudinally perpendicular to the direction A, is substantially square cross-section and is formed with a lower central hole in which the upper end of a corresponding bearing housing 171 is secured by bolts 170. Each bearing housing 171 rotatably carried a corresponding upwardly extending and normally vertical or substantially vertical shaft 172 by means of upper and lower ball bearings 173. Each shaft 172 projects from beneath the bottom of the corresponding bearing housing 171 and is there splined to receive the hub of one of the previously described soil working members 57. The upper end of each shaft 172 is located inside the corresponding housing 169A and is there provided with a bevel pinion 174 whose teeth are in driven mesh with those of a co-operating bevel pinion 175 which is fastened to a driving shaft 176 whose longitudinal axis is coincident with that of the housing 169A concerned. Each shaft 176 is rotatably supported, near the opposite ends of the corresponding housing 169A, by horizontal ball bearings 177, each shaft 176 projecting beyond the opposite ends of the corresponding housing 169A. As can be seen in FIGS. 8 and 9 of the drawings, the ends of neighbouring housings 169A are interconnected by pairs of lugs 178 that project from those housings, substantially horizontal pivot pins 179 that extend substantially parallel to the direction A being employed to interconnect the lugs 178 in the manner which can be seen best in FIG. 8 of the drawings. The facing ends of the successive shafts 176 are splined and are interconnected by universal joints that are illustrated in FIG. 9 of the drawings, said universal joints being intersected by the axes $e$ that are defined by the pivot pins 179 and that extend substantially horizontally parallel to the direction A. Each assembly of lugs 17, pivot pins 179 and universal joint is enclosed in a corresponding flexible envelope 180. The driving shaft 176 of one of the housings 169A that is located at, or near, the center of the rotary harrow is provided with a transmission by which it may be placed in driven connection with the power take-off shaft of an agricultural tractor or with the operating vehicle. This transmission is not illustrated in FIGS. 8 and 9 of the drawings but may be similar to the transmission illustrated in FIGS. 5 and 6 or to the transmission partially illustrated in FIG. 7 thereof.

The front of the main beam 160 with respect to the direction A carries lugs 182 to which pair of arms 183 are connected by pivot pins 181 in such a way that said arms 183 extend downwardly from the pivot pins. The lowermost ends of the arms 183 are interconnected by the previously described hollow beam 80 and said arms 183 and beam 80 tend to be retained in the position illustrated in FIG. 8 of the drawings by spring mechanisms which comprise the parts 75 and 79 and that are similar to the spring mechanism one of which is illustrated in FIG. 2 of the drawings and which mechanisms have been described in detail above. The spring mechanisms allow the beam 80 to deflect forwardly about the pivot pins 181, when required, to free momentarily jammed stones and other obstacles.

The rotary harrow illustrated in FIGS. 8 and 9 of the drawings is basically similar in operation to the harrow that has already been described with reference to FIGS. 1 to 3 of those drawings but, in this embodiment, each soil working member 57 can deflect sideways about the longitudinal axes $d$ (FIG. 8) of the shafts 165 and 169 of the corresponding crank 166 and can also deflect upwardly and downwardly about the axis $e$ that is defined by the corresponding pair of pivot pins 179. The interconnection of the driving shafts 176 by the universal joints that are illustrated in FIG. 9 of the drawings usually means that any upwardly and/or laterally deflected soil working member 57 will also cause at least some upward an/or lateral deflection of at least the immediately neighbouring soil working member or members 57. The deflectability of the soil working members 57 is almost always successful in avoiding damage to the soil working members 57 when they meet stones or other potentially injurious obstacles.

FIGS. 10 and 11 of the drawings illustrate an embodiment in which a hollow box-shaped main frame beam 184 is provided that extends substantially horizontally transverse, and normally substantially horizontally perpendicular, to the intended direction of operative travel A of the rotary harrow. A plurality of upwardly extending and normally vertical or substantially vertical shafts 185 are rotatably journalled in the hollow main frame beam 184 at regularly spaced apart intervals that preferably have magnitudes of substantially 25 centimeters but that may be as large as substantially 30 centimeters. The shafts 185 project beneath the bottom of the hollow main frame beam 184 and are there provided with corresponding straight-toothed or spur-toothed pinions 186 whose teeth are in mesh with those of corresponding similarly toothed but smaller pinions 187. The pinions 187 are mounted on shafts 188 that extend parallel to the shafts 185, each pair of pinions 186 and 187 are portions of the corresponding shafts 185 and 188 being contained within a corresponding housing 189. Rotatable soil working members that are generally indicated by the reference 191 are secured to the lowermost ends of the shafts 188 and each soil working member 191 comprises a substantially horizontal tine or other tool support 190 having a central hub that is fastened to the lowermost end of the corresponding shaft 188, two substantially cylindrical tine or other tool holders 192 that are fastened to the opposite ends of the support 190 with their axes parallel or substantially parallel to the axis of the corresponding shaft 188, and two tools in the form of rigid soil working tines 193 having fastening portions that are firmly but releasably secured in the correponding holders 192 so that the tines 193 extend downwardly from those holders towards the ground surface.

Each housing 189 is pivotally arranged, by means of a substantially vertical bearing that is not visible in the drawings, about the vertical or substantially vertical axis of the corresponding shaft 185 and, at its front with respect to the direction A, it is provided with a forwardly projecting bracket 194. The leading end of each bracket 194, which projects forwardly in substantially the direction A, is formed with a substantially horizontal slot 195 through which is entered a substantially horizontal rod 197 that also passes through the slots 195 in the other brackets 194 and that is carried by substantially regularly spaced apart supports 196 that depend from the main frame beam 184. As can be seen in FIG. 10 of the drawings, the rod 197 thus passes alternately through the slots 195 in the brackets 194 and through the holes in the supports 196, said rod 197 being surrounded, between each of those successive parts, by a corresponding helical compression spring 198. The arrangement is such that each housing 189 is bodily deflectable, with the corresponding soil working member 191, about the axis $g$ of the corresponding shaft 185, and such deflections being opposed by one of the correponding pair of springs 198 and said springs 198 tending to maintain each housing 189 in a central undeflected equilibrium position as illustrated in FIGS. 10 and 11. When required, the rod 197 can be moved axially from its illustrated operative position. Each shaft 185 carries, inside the hollow main frame beam 184, a corresponding straight-toothed or spur-toothed pinion 199 and said pinions 199 are so arranged that, as can be seen in outline at the top of FIG. 10, the teeth of each of them are in mesh with those of its neighbour, or both of its neighbours, in a row thereof. At or near the center of the rotary harrow, one of the shafts 185 is coupled to a transmission that is arranged for connection to the power take-off shaft of an agricultural tractor or other operating vehicle. This transmission is nt illustrated in FIGs. 10 and 11 of the drawings but may be generally similar to one of the transmissions for the same purpose that has been described above. However, it is preferred that the transmission should include a change-speed gear by which different transmission ratios between two shafts can be selected thus enabling the soil working members 191 to be revolved at faster or slower speeds, in dependence upon the setting of the change-speed gear, without having to alter the input speed of rotation that is applied to the transmission from the power-off shaft of the operating tractor or other vehicle. A central front region of the main frame beam 184 is provided with a coupling member or trestle (not shown) that may be similar to the previously described coupling member or trestle 88, said coupling member or trestle being constructed and arranged for connection to the threepoint lifting device or hitch of an agricultural tractor or other operating vehicle.

FIGS. 12 and 13 of the drawings illustrate an embodiment in which a main supporting frame in the form of a hollow main frame beam 200 extends substantially horizontally transverse, and normally substantially horizontally perpendicular, to the intended direction of operative travel of the rotary harrow which is indicated in FIG. 12 of the drawings by the arrow A. The main beam 200 rotatably supports a plurality of the previously described shafts 185 but, in this case, said shafts 185 are arranged with their combined longitudinal axes and axes of rotation g extending substantially horizontally parallel to the direction A. The rear ends of the shafts 185 with respect to the direction A extend into corresponding housings 201 where they carry bevel pinions 204 which have teeth that are in mesh with those of further bevel pinions 203 mounted at the upper ends of vertical or substantially vertical shafts 202. The shafts 202 are rotatably supported in the housings 201 by ball bearings that are not illustrated in the drawings and the lowermost end of each shaft 202, that projects from beneath the bottom of the corresponding housing 201, has a corresponding one of the previously described soil working members 191 firmly but releasably secured to it. Each housing 201 is pivotable, by means of horizontal bearings that are not visible in the drawings, about the corresponding axis g and the top of each housing is provided with an upwardly projecting bracket 205 that is formed, near its upper end, with a substantially vertial slot 206. Each shaft 185 is provided, inside the main frame beam 200, with one of the straight-toothed or spur-toothed pinions 199, the arrangement being the same as that in the embodiment of FIGS. 10 and 11 of the drawings except for the substantially horizontal, rather than substantially vertical, disposition of the axes g. Once again, one of the shafts 185 at or near the center of the rotary harrow is coupled to a transmission which can be connected to the power take-off shaft of an agricultural tractor or other operating vechicle. As in the case of the embodiment of FIGS. 10 and 11 of the drawings, such transmission preferably, but not essentially, includes a change-speed gear.

A substantially horizontal rod 208 extends substantially perpendicular to the direction A, said rod 208 being passed through all of the substantially vertical slots 206 and through holes in supports 207 to at least some of which supports 207 the rod is releasably fastened so that it can be withdrawn axially from its illustrated position. The previously mentioned helical compression springs 198 are provided around the rod 208 so as to bear between the alternate brackets 205 and supports 207. Thus, during operation of the rotary harrow, each soil working member 191 in the embodiment of FIGS. 12 and 13 of the drawings can deflect bodily, with the corresponding housing 201, about the substantially horizontal axis g of the corresponding shaft 185 against the action of one of the corresponding pair of compression springs 198, said springs 198 tending to maintain each soil working member 191 and housing 201 in the central undeflected equilibrium position thereof that is illustrated in FIGS. 12 and 13. A coupling member or trestle that is not illustrated in FIG. 12 of the drawing is employed to connect the main frame beam 200 to the threepoint lifting device or hitch of an agricultural tractor or other operating vehicle and a rotary input shaft of the aforementioned transmission is used to place the soil working members 191 in indirect driven connection with the power take-off shaft of the same agricultural tractor or other operating vehicle.

In the two embodiments that are illustrated in FIGS. 10 to 13 of the drawings, each soil working member 191 revolves, during the use of the rotary harrow, in the opposite direction to its immediate neighbour, or to both of its immediate neighbours. Each soil working member 191 works a corresponding strip of land that has a width of substantially 30 centimeters, the individual strips of land overlapping one another to produce, in effect, a single broad strip of worked soil. When one or more of the soil working members 191 encounters a stone or like obstacle, the or each member 191 concerned can deflect bodily to avoid damage by pivoting, against the opposition of one of the springs 198, about the corresponding axis g which, in the embodiment of FIGS. 10 and 11 of the drawings, is substantially vertically disposed but which, in the embodiment of FIGS. 12 and 13 of the drawings, is substantially horizontally disposed so as to extend substantially parallel to the direction A. In the embodiment of FIGS. 10 and 11 of the drawings, the axes g are located in front of the corresponding soil working members 191 with respect to the direction A whereas, in the embodiment of FIGS. 12 and 13 of the drawings, the axes g are located above the corresponding soil working members 191.

FIGS. 14 and 15 of the drawings illustrate an embodiment in which the previously described shafts 185 are vertically or substantially vertically disposed inside the hollow box-shaped frame beam 184, each shaft 185 being provided, inside the beam 184, with a corresponding one of the straight-toothed or spur-toothed pinions 199, those pinions 199 being arranged in the same manner as has already been described above. The beam 184 extends substantially horizontally transverse, and normally substantially horizontally perpendicular, to the intended direction of operative travel of the harrow and each shaft 185 projects downwardly from beneath the bottom of the main frame beam 184. The lowermost end of each shaft 185 is connected by a corresponding flexible coupling 209 to the upper end of a corresponding vertical or substantially vertical shaft 211. Each flexible coupling 209 comprises inner and outer square members and four intervening rubber or other elastic elements 210 through which drive is transmitted from the corresponding shaft 185 to the corresponding shaft 211. Each shaft 211 is rotatably supported, toward its lower end, by a substantially vertical ball bearing 212 that is arranged in a bearing housing 213 at the foot of a corresponding inverted frusto-conical support 214. As can be seen in FIG. 14 of the drawings, the top of each support 214 has a substantially horizontal rim 216 which is resiliently connected to the bottom of the main frame beam 184 at four points (only two of which are visible) by screwthreaded dowels 215 whose shanks are surrounded, between the rim 216 and the upper ends of the dowels that are fastened to the main frame beam 184, by corresponding elastic blocks 217. The lowermost end of each shaft 211 projects downwardly beyond the corresponding bearing housing 213 and is there splined to receive the hub of the tine or other tool support 190 of one of the previously described soil working members 191.

Due to the previously described arrangement of the pinions 199, each soil working member 191 revolves, during the use of a harrow constructed in accordance with FIGS. 14 and 15 of the drawings, in the opposite direction to its immediate neighbour, or to both of its immediate neighbours, in a row thereof. If a large stone or other obstacle should become momentarily jammed between the tines 193 or other soil working tools of at least two neighbouring members 191, at least one of those members 191 can deflect bodily to avoid the stone or to enable it to be released. In this embodiment, bodily deflection can take place in substantially any direction because of the provision of the flexible couplings 209 and the elastic blocks 217. However, generally speaking, the major component of any deflection will be horizontally or substantially horizontally disposed. If desired, the flexible couplings 209 may be replaced by universal joints.

All of the various embodiments that have been described enable individual soil working members to deflect bodily with respect to one another and to the supporting frame of the rotary harrow concerned to such an extent that any stones and other obstacles of the sizes that are normally met with during on agricultural land can be avoided and/or will be very quickly released in the event that they should momentarily jam between the tines or other soil working tools immediately neighbouring soil working members. This avoids damage to the soil working members in the cases of all but the most stubborn obstacles and reduces the rate of cumulative wear.

Although certain features of the rotary harrows that have been described and/or that are illustrated in the accompanying drawings will be set forth in the following claims are inventive features, it is emphasised that the invention is not necessarily limited to those features and that it includes within its scope each of the parts of each rotary harrow that has been described and/or that has been illustrated in the accompanying drawings, both individually and in various combinations.

What I claim is:

1. A rotary harrow comprising a frame having an elongated frame portion, said portion extending transverse to the normal direction of travel of said harrow, a plurality of soil-working members being mounted side by side and being rotatable about upwardly extending axes defined by corresponding shafts supported on said portion, driving means connected to rotate said shafts and the shafts of adjacent soil-working members being rotated in relative opposite directions, each soil-working member comprising support means having downwardly extending tines and the tines of said members being rotatable about said shafts to work adjoining circular paths, the diameter of the circle defining each path substantially equalling or exceeding the distance between the axes of rotation of two adjacent soil-working members, at least some of said soil-working members being pivotable with repect to adjacent soil-working members about respective pivot axes that extend transverse to the direction of travel, each pivotable soil-working member being displaceable as a unit with respect to an adjacent member responsive to contact with obstacles in and on the ground.

2. A harrow as claimed in claim 1, wherein said soil working member is displaceable about a substantially horizontally pivotal axis.

3. A harrow as claimed in claim 1, wherein each said pivotable soil working member is displaceable about one of said transverse axes, said one axis being located in front of that member with respect to the direction of travel.

4. A harrow as claimed in claim 3, wherein each said pivotable soil working member is displaceable as a unit about a second axis that is substantially spaced from said first mentioned axis.

5. A harrow as claimed in claim 4, wherein said two axes intersect one another.

6. A harrow as claimed in claim 5, wherein said two axes intersect one another substantially perpendicularly.

7. A harrow as claimed in claim 4, wherein said said one and said second axes intersect one another and said one axis extends substantially horizontally transverse to the direction of travel, said second axis extending substantially horizontally parallel to said directon of travel, said first axis being located in front of said soil-working members.

8. A harrow as claimed in claim 1, wherein limiting means limits the pivotable movement of said soil-working member in two directions, said limiting means comprising a spring mechanism.

9. A soil-cultivating implement or rotary harrow comprising a frame and a plurality of soil-working members being mounted on said frame in a row that extends transverse to the direction of travel, said members being rotatable on corresponding upwardly extending shafts and driving means connected to rotate said shafts and soil-working members, each soil-working member being connected to said frame by a pivotal mounting that comprises a first bearing and a second bearing, said bearings being spaced apart and movable with respect to one another, and said second bearing being movable with respect to said frame, said first bearing rotatably supporting a respective transmission shaft of said member that extends substantially parallel to the direction of travel and said transmission shaft being connected to the upwardly extending shaft of said soil-working member, said first bearing being pivotable relative to the second bearing about an axis which coincides with the longitudinal axis of said transmission shaft.

10. A harrow as claimed in claim 9, wherein each soil working member is also pivotable about its respective transmission shaft.

11. A harrow as claimed in claim 10, wherein a pivotal mounting of said soil working member comprises a first bearing which is displaceable relative to a second bearing and the transmission shaft is journalled in these bearings.

12. A harrow as claimed in claim 9, wherein said second bearing is included in a tie part located between supports that house a common driving shaft for all of the transmission shafts for said soil working members.

13. A harrow as claimed in claim 12, wherein said supports are fixed in positions on said frame.

14. A harrow as claimed in claim 12, wherein said supports and said tie parts together comprise a supporting structure that houses said common driving shaft.

15. A harrow as claimed in claim 12, wherein said second bearing is pivotable about an axis which coincides with the longitudinal axis of said common driving shaft.

16. A harrow as claimed in claim 15, wherein pairs of bevel pinions interconnect the common driving shaft with the transmission shafts.

17. A harrow as claimed in claim 16, wherein the pairs of bevel pinions are accommodated in corresponding tie parts for said soil working member.

18. A harrow as claimed in claim 17, wherein said transmission shafts engage said upwardly extending shafts via further pairs of bevel pinions.

19. A harrow as claimed in claim 18, wherein said further pairs of bevel pinions are accommodated in corresponding gear boxes that are pivotally coupled to the corresponding tie parts by the corresponding first bearings.

20. A harrow as claimed in claim 15, wherein stop means is positioned to limit movements of the two bearings in two directions.

21. A harrow as claimed in claim 20, wherein said stop means comprises a spring mechanism arranged at a level above said bearings, each spring mechanism comprising at least one compression spring that biases said members and their corresponding tie parts to a central position.

22. A rotary harrow comprising a frame having an elongated frame portion, said portion extending transverse to the normal direction of travel of said harrow, a plurality of soil-working members being mounted side by side and being rotatable about upwardly extending axes defined by corresponding shafts supported on said portion, driving means connected to rotate said shafts and the shafts of adjacent soil-working members being rotated in relative opposite directions, each member comprising a support having downwardly extending tines, the tines of said members being rotatable about said shafts to work adjoining circular paths and the diameter of the circle defining each path substantially equalling or exceeding the distance between the axes of rotation of two adjacent soil-working members, at least some of said soil-working members being pivotable about respective pivot axes and each pivotable member being independently swingable upwardly as a unit with respect to an adjacent member responsive to contact with obstacles in and on the ground, spring means biasing said pivotable member to an operative central position.

23. A harrow as claimed in claim 22, wherein said soil working members includes a first group of independently displaceable working members that are pivoted to said frame and a second group of non-displaceable working members that are fixed to the frame, a member of said first group being positioned between members of said second group.

24. A harrow as claimed in claim 23, wherein each working member of the second group is supported by a housing located between two pivotable supports for members of pivotable working members of said first group.

25. A harrow as claimed in claim 24, wherein each housing is elongated in configuration and its longitudinal axis extends substantially horizontally transverse to the direction of travel.

26. A harrow as claimed in claim 24, wherein said row of soil working members is substantially zig-zag in configuration with members of said first group being located in front of the members of the second group with respect to the direction of travel.

27. A harrow as claimed in claim 22, wherein at least one soil working member is pivotally mounted on said frame with a connecting bracket.

28. A harrow as claimed in claim 27, wherein said bracket carries a support housing for a transmission shaft to said soil working member.

29. A harrow as claimed in claim 28, wherein said bracket is pivotable about an axis which intersects the longitudinal axis of the transmission shaft substantially perpendicularly.

30. A harrow as claimed in claim 29, wherein said transmission shaft includes a universal joint that is intersected by the axis about which said bracket is pivotable.

31. A harrow as claimed in claim 29, wherein the axis about which said bracket is pivotable extends substantially perpendicular to the direction of travel.

32. A harrow as claimed in claim 29, wherein the axis about which said bracket is pivotable extends substantially horizontally.

33. A harrow as claimed in claim 29, wherein each soil working member is connected to the frame by a pivotable bracket and the axes about which brackets that correspond to each of said soil working members are pivotable, are substantially coincident with one another.

34. A harrow as claimed in claim 22, wherein said member is pivoted to the frame by a crank, which includes two shaft portions that extend substantially parallel to the direction of travel.

35. A harrow as claimed in claim 34, wherein said member depends from a housing and a rear shaft portion is journalled in said housing, a front shaft portion being journalled on said frame.

36. A harrow as claimed in claim 35, wherein there are a plurality of side-by-side soil working members with neighbouring housings pivotally interconnected, each of said members being connected to a common frame.

37. A harrow as claimed in claim 36, wherein the axes of the pivotal connections between neighbouring housings extend substantially parallel to the rear shafts of the cranks.

38. A harrow as claimed in claim 37, wherein each housing contains a driving shaft which engages an upwardly extending shaft that defines that axis of rotation of the corresponding soil working member, adjacent driving shafts that correspond to neighbouring housings being interconnected by universal joints.

39. A harrow as claimed in claim 38, wherein said driving shafts comprise a common drive transmission for the soil working members and these shafts each have corresponding pinions, the teeth of which are in mesh with the respective teeth of further pinions on said upwardly extending shafts, said upwardly extending shafts being pivotable relative to said driving shafts.

40. A harrow as claimed in claim 39, wherein said upwardly extending shafts are substantially vertical.

41. A harrow as claimed in claim 22 with said driving means comprising elongated common transmission means that extends substantially parallel to said row and corresponding transmission shafts connected to the transmission means by meshed pinions, said transmission shafts being connected to corresponding upwardly extending shafts by further meshed pinions and said members with their upwardly extending shafts each being pivotal as a unit on its corresponding transmission shaft responsive to contact with an obstacle.

42. A harrow as claimed in claim 41, wherein said upwardly extending shafts are rotatably mounted in corresponding housings that enclose said pinions, said sections being pivotable relative to said transmission shafts.

43. A harrow as claimed in claim 42, wherein each housing is pivotable out of an equilibrium position to a limited extent against resilient means.

44. A harrow as claimed in claim 43, wherein said resilient means is a spring mechanism that comprises a rod extending substantially parallel to said frame, helical compression springs being mounted on said rod between supports of said frame and brackets on said housings.

45. A harrow as claimed in claim 44, wherein said rod is located in front of the axes of rotation of the soil working members with respect to the direction of travel.

46. A harrow as claimed in claim 41, wherein immediately neighbouring transmission shafts are drivingly interconnected by toothed pinions.

47. A harrow as claimed in claim 22, further comprising each soil working member being driven by a pinion gear in mesh with the pinion gear of a neighbouring soil working member, and each pinion gear having a transmission shaft connected to a corresponding upwardly extending shaft of a member by a bearing, each member and its upwardly extending shaft being independently displaceable relative to said frame responsive to contact with an obstacle.

48. A harrow as claimed in claim 47, wherein said upwardly extending shafts are universally movable in any direction with respect to said frame.

49. A harrow as claimed in claim 48, wherein said upwardly extending shaft has a rotary bearing that is connected to said driving means through the intermediary of the elastic material.

50. A harrow as claimed in claim 44, wherein said elastic material is located between a support for said bearing and the bottom of said frame.

51. A harrow as claimed in claim 47, wherein each bearing is a universal coupling that comprises at least one elastic element.

52. A harrow as claimed in claim 51, wherein said universal coupling comprises a universal joint.

53. A harrow as claimed in claim 47, wherein said soil working members extend in a row substantially perpendicular to the direction of travel.

54. A harrow as claimed in claim 53, wherein said row comprises at least six soil working members.

55. A harrow as claimed in claim 47, wherein each soil working member comprises two spaced apart tines, the lengths of which are equal to not less than the distance between said two tines.

56. A harrow as claimed in claim 47, wherein a rotatable supporting member is positioned behind said soil working members with respect to the direction of travel and said supporting member is upwardly and downwardly adjustable in position relative to said soil working members.

57. A harrow as claimed in claim 56, wherein said rotatable supporting member comprises a plurality of support plates carried by a central tubular support, said support plates being provided, at their peripheries, with a plurality of elongated elements that extend in the same general direction as the axis of rotation of the supporting member.

58. A harrow as claimed in claim 57, wherein said elongated elements are wound helically around the axis of rotation of the supporting member.

59. A harrow as claimed in claim 47, wherein said transmission means is contained within an elongated hollow frame beam.

60. A harrow as claimed in claim 59, wherein said transmission means comprise meshed pinion gears.

61. A rotary harrow comprising a frame having an elongated frame portion, said portion extending transverse to the normal direction of travel of said harrow, a plurality of soil-working members being mounted side by side and being rotatable about upwardly extending axes defined by corresponding shafts supported on said portion, driving means connected to rotate said shafts and the shafts of adjacent soil-working member comprising support means having downwardly extending tines, the tines of said members being rotatable about said shafts to work adjoining circular paths, the diameter of the circle defining each path substantially equalling or exceeding the distance between the axes of rotation of two adjacent soil-working members, at least some of said soil-working members being independently pivotably about two respective pivot axes, said pivot axes being spaced apart and each pivotal soil-working member being displaceable as a unit about either of said two axes with respect to an adjacent member, responsive to contact with obstacles in and on the ground.

62. A harrow as claimed in claim 61, wherein said two axes are substantially parallel to one another.

63. A harrow as claimed in claim 62, wherein said two axes both extend substantially parallel to the direction of travel.

64. A harrow as claimed in claim 61, wherein said two axes are located at different levels.

65. A harrow as claimed in claim 61, wherein said first axis is at a higher level than said second axis.

66. A rotary harrow comprising a frame having an elongated frame portion, said portion extending transverse to the normal direction of travel of said harrow, a plurality of soil-working members being mounted side by side and being rotatable about upwardly extending axes defined by corresponding shafts supported on said portion, driving means connected to rotate said shafts and the shafts of adjacent soil-working members being rotated in relative opposite directions, each soil-working member comprising support means having downwardly extending tines, the tines of said members being rotatable about said shafts to work adjoining circular paths, the diameter of the circle defining each path substantially equalling or exceeding the distance between the axes of rotation of two adjacent soil-working members, said driving means comprising a drive shaft that engages said upwardly extending shafts and at least some of the soil-working members being independently pivotable about said drive shaft and displaceable upwardly as a unit relative to adjacent soil-working members, responsive to contact with an obstacle in and on the ground.

67. A rotary harrow comprising a frame having an elongated frame portion, said portion extending transverse to the normal direction of travel of said harrow, a plurality of soil-working members being mounted side by side and being rotatable about upwardly extending axes defined by corresponding shafts supported on said portion, driving means connected to rotate said shafts and the shafts of adjacent soil-working members being rotated in relative opposite directions, each soil-working member comprising support means having downwardly extending tines, the tines of said members being rotatable about the said shafts to work adjoining circular paths, the diameter of the circle defining each path substantially equalling or exceeding the distance between the axes of rotation of two adjacent soil-working members, said driving means comprising a drive shaft that engages said upwardly extending shafts through respective transmission shafts and at least some of the soil-working members together with their transmission shafts being independently pivotable about said drive shaft and displaceable upwardly as a unit relative to adjacent soil-working members responsive to contact with an obstacle in and on the ground, said transmission shafts extending substantially parallel to the direction of travel and each of said soil-working members being pivotable about its respective transmission shaft.

* * * * *